United States Patent [19]

Cooper

[11] Patent Number: 5,440,919
[45] Date of Patent: Aug. 15, 1995

[54] METHOD OF INTRODUCING LEAK DETECTION DYE INTO AN AIR CONDITIONING OR REFRIGERATION SYSTEM

[75] Inventor: B. William Cooper, Lloyd Harbor, N.Y.

[73] Assignee: Spectronics Corporation, Wesbury, N.Y.

[21] Appl. No.: 297,355

[22] Filed: Aug. 29, 1994

[51] Int. Cl.⁶ ............................................. G01M 3/20
[52] U.S. Cl. ........................................................ 73/40.7
[58] Field of Search ............... 73/40.5 R, 40.7; 62/77, 62/125; 252/68, 301.16, 964

[56] References Cited

U.S. PATENT DOCUMENTS

| | | | |
|---|---|---|---|
| 1,279,679 | 9/1918 | Fear | 8/526 |
| 1,800,693 | 4/1931 | Marshall | 436/3 |
| 1,935,901 | 11/1933 | Augenblick | 8/6 |
| 2,096,099 | 10/1937 | Gaugler | 73/51 |
| 2,260,608 | 10/1941 | Cormack | 62/115 |
| 2,341,430 | 2/1944 | Elsey | 62/170 |
| 2,428,426 | 10/1947 | Lindsay | 312/31.1 |
| 2,506,806 | 5/1950 | Metzger | 62/115 |
| 2,526,938 | 10/1950 | Davis et al. | 252/408 |
| 2,579,053 | 12/1951 | Schulstadt | 210/131 |
| 2,682,857 | 7/1954 | Reissmann et al. | 116/114 |
| 2,757,632 | 8/1956 | Wittlin | 116/117 |
| 2,918,033 | 12/1959 | Snyder | 116/114 |
| 2,918,893 | 12/1959 | Norton | 116/114 |
| 2,994,295 | 8/1961 | Newcum | 116/117 |
| 3,006,861 | 10/1961 | Browning et al. | 252/408 |
| 3,121,615 | 2/1964 | Price et al. | 23/254 |
| 3,323,350 | 6/1967 | Roberts | 73/40.7 |
| 3,370,013 | 2/1968 | Labac | 252/68 |
| 3,770,640 | 11/1973 | Bartlett | 252/68 |
| 3,774,022 | 11/1973 | Dubrow et al. | 240/2.25 |
| 3,785,164 | 1/1974 | Wrenn, Jr. | 62/129 |
| 3,838,578 | 10/1974 | Sakasegawa et al. | 62/125 |
| 3,876,378 | 4/1975 | Montagnon | 23/253 |
| 3,898,172 | 8/1975 | Reif et al. | 252/408 |
| 4,046,507 | 9/1977 | Zweifel et al. | 8/79 |
| 4,072,615 | 2/1978 | McConnell | 210/282 |
| 4,109,487 | 8/1978 | Carr | 62/474 |
| 4,170,564 | 10/1979 | Brendle | 252/68 |
| 4,187,798 | 2/1980 | Yoshimura | 116/206 |
| 4,348,235 | 9/1982 | Lasswell et al. | 106/33 |
| 4,487,707 | 12/1984 | Holzknecht | 252/68 |
| 4,745,772 | 5/1988 | Ferris | 62/292 |
| 4,758,366 | 7/1988 | Parekh | 252/68 |
| 4,784,959 | 11/1988 | Wegrzyn | 436/3 |
| 4,822,743 | 4/1989 | Wegrzyn | 436/3 |
| 4,938,063 | 7/1990 | Leighley | 73/40.7 |
| 5,149,453 | 9/1992 | Parekh | 252/68 |
| 5,167,140 | 12/1992 | Cooper et al. | 73/40.7 |
| 5,167,867 | 12/1992 | Quaife et al. | 252/408.1 |
| 5,251,453 | 10/1993 | Stanke et al. | 62/126 |
| 5,301,537 | 4/1994 | Atkinson | 73/40 |

*Primary Examiner*—Hezron E. Williams
*Assistant Examiner*—Michael J. Brock
*Attorney, Agent, or Firm*—Seidel Gonda Lavorgna & Monaco

[57] ABSTRACT

A method of introducing a leak detection additive into a closed refrigeration system by a substrate containing the additive. A predetermined amount of the additive is implanted on and absorbed into a host swatch of substrate material which is capable of absorbing and releasing the leak detection additive, but which does not react with refrigerant or system lubricant. The swatch is installed in a desiccant bag, which is then installed in a dehydrator of the refrigeration system. The refrigeration system is assembled, charged and operated, by which the refrigerant and system lubricant flowing through the desiccant bag mixes the additive with the refrigerant and system lubricant. In alternative embodiments, the substrate is constructed to be used as a filter in various components of the refrigeration system.

13 Claims, 4 Drawing Sheets

METHOD OF INTRODUCING LEAK DETECTION DYE INTO AN AIR CONDITIONING OR REFRIGERATION SYSTEM

FIELD OF THE INVENTION

This invention relates generally to the field of detecting leaks in an air conditioning or other refrigeration system and, more particularly, to an improved method of introducing a leak detection dye into the system.

BACKGROUND OF THE INVENTION

There has long been a need to locate leaks in closed refrigeration systems, originally because the loss of refrigerant reduces the cooling capacity of the system, and increasingly because the refrigerants themselves are potential hazardous or deleterious substances when released to the atmosphere. In particular, the production and use of chlorofluorocarbon (CFC) and hydrochlorofluorocarbon (HCFC) refrigerants is scheduled for incremental phaseout, and for recovery and recycling in the interim.

Various methods have been used for detecting and locating leaks in a refrigeration system. Since a slow leak of refrigerant is essentially silent and invisible, such methods have included halide torches, electronic sensors, coating exterior joints with material which reacts with the refrigerant, and injecting various types of dye into the refrigeration equipment to locate sites where the dye exits the system.

One of the most effective methods for detecting leaks in refrigeration systems, and a preferred method to be practiced with the present invention, comprises infusing into the refrigeration system an effective amount of a fluorescent dye compound, dissolved either in the system lubricating oil or in a mixture of the oil and refrigerant. The dye compound circulates with the refrigerant and oil throughout the refrigeration circuit, and is carried out with escaping refrigerant at a leak site. When the refrigeration system is exposed to ultraviolet light, even a small deposit of the dye compound is brilliantly fluorescent to allow visual detection of the leak. U.S. Pat. No. 5,149,453 discloses such a method for detecting leaks in a refrigeration system, and its content is incorporated herein by reference.

When practicing the above method of leak detection with a fluorescent dye, care has to be taken that the fluorescent dye additive is not allowed to contact the exterior of the refrigeration system as the dye is being introduced into the system. If dye additive is inadvertently spilled or rubbed on the exterior of the system, it will be difficult to distinguish between florescence from a leak site and that resulting from inadvertent external contact. This is a particular concern where the dye additive is used for quality assurance checks of air conditioners on newly assembled automobiles, as the air conditioning system's final assembly is usually completed in the automobile assembly line, after which the system is charged with refrigerant and leak detection additive, then operated to circulate the additive and reveal any leaks when viewed under ultraviolet light. While care is normally taken to prevent the refrigerant from escaping, the nature of the assembly and charging process creates a risk of spills or inadvertent contamination on clothing or tools. Since very low concentration of dye is required to produce fluorescence, any dyed refrigerant or oil spilled or rubbed on the exterior of the air conditioning system may cause false leak indications.

Consequently, it would be desirable to have a method of introducing leak detection dye into the air conditioning system prior to the initial charging of the system, as this expedient would virtually eliminate any possibility of inadvertent dye contact to the exterior of the air conditioner.

For that reason, an objective and advantage of the present invention is a method by which the leak detection dye additive is installed in an air conditioning or other refrigeration system before the system is charged with refrigerant. The leak detection dye is released into the refrigerant immediately after the system is charged and operated, in order to reduce the risk of inadvertent contact of the dye on the outside of the system and yet permit quality control leak testing after charging and remains in the system to permit subsequent leak detection.

Another objective and advantage of the present invention is a method which allows leak detection dye additive to be installed and stored in a component of the air conditioning system well prior to assembly of the complete system.

Another objective and advantage of the present invention is a method to pre-install a specific quantity of dye additive which is proportional to the amount of initial charge of refrigeration lubricant, to ensure that a predictable concentration of dye will be introduced.

Further objects, features and advantages of the present invention, will become apparent to those skilled in the art as the invention is more fully understood by reading the accompanying drawings and detailed descriptions.

SUMMARY OF THE INVENTION

The present invention provides an improved method of introducing a leak detection dye additive into an air conditioning or other refrigeration system. For brevity, the description of the invention is made herein with reference to an air conditioning system, it being understood that it is applicable to other refrigeration systems as well.

A substrate material which is absorbent to the dye additive is cut into a swatch which is shaped according to its intended placement in the system, and a specific amount of the dye additive is placed onto and absorbed into the swatch. For example, in an embodiment intended for use inside a desiccant bag, a swatch of melamine treated polyester felt may be cut to form a circular wafer. The wafer with absorbed additive is inserted into a desiccant bag, and the desiccant bag is then installed in a dehydrator unit of an air conditioning system. When the air conditioning system is assembled from its components, charged with refrigerant, and operated to cycle the refrigerant and system lubricant through the system, the refrigerant and system lubricant flows through the desiccant bag and takes the dye into solution.

In another embodiment, the substrate may be used as a filter component, as for example in a replaceable filter-drier cartridge, or with a solid-core drier. In this embodiment, a woven or fibrous mesh material is cut to the shape of a filter component of the drier, and continues to function as a particle filter after releasing its dye additive into the refrigerant.

Further objects, features and advantages of the present invention will become more apparent to those skilled in the art as the nature of the invention is better understood from the accompanying drawings and detailed description.

BRIEF DESCRIPTION OF THE DRAWINGS

For the purpose of illustrating the invention, the drawings show a form of the invention which is presently preferred; it being understood, however, that the invention is not limited to the precise arrangement and instrumentality shown.

DESCRIPTION OF THE REFERRED EMBODIMENTS

Figure 1:
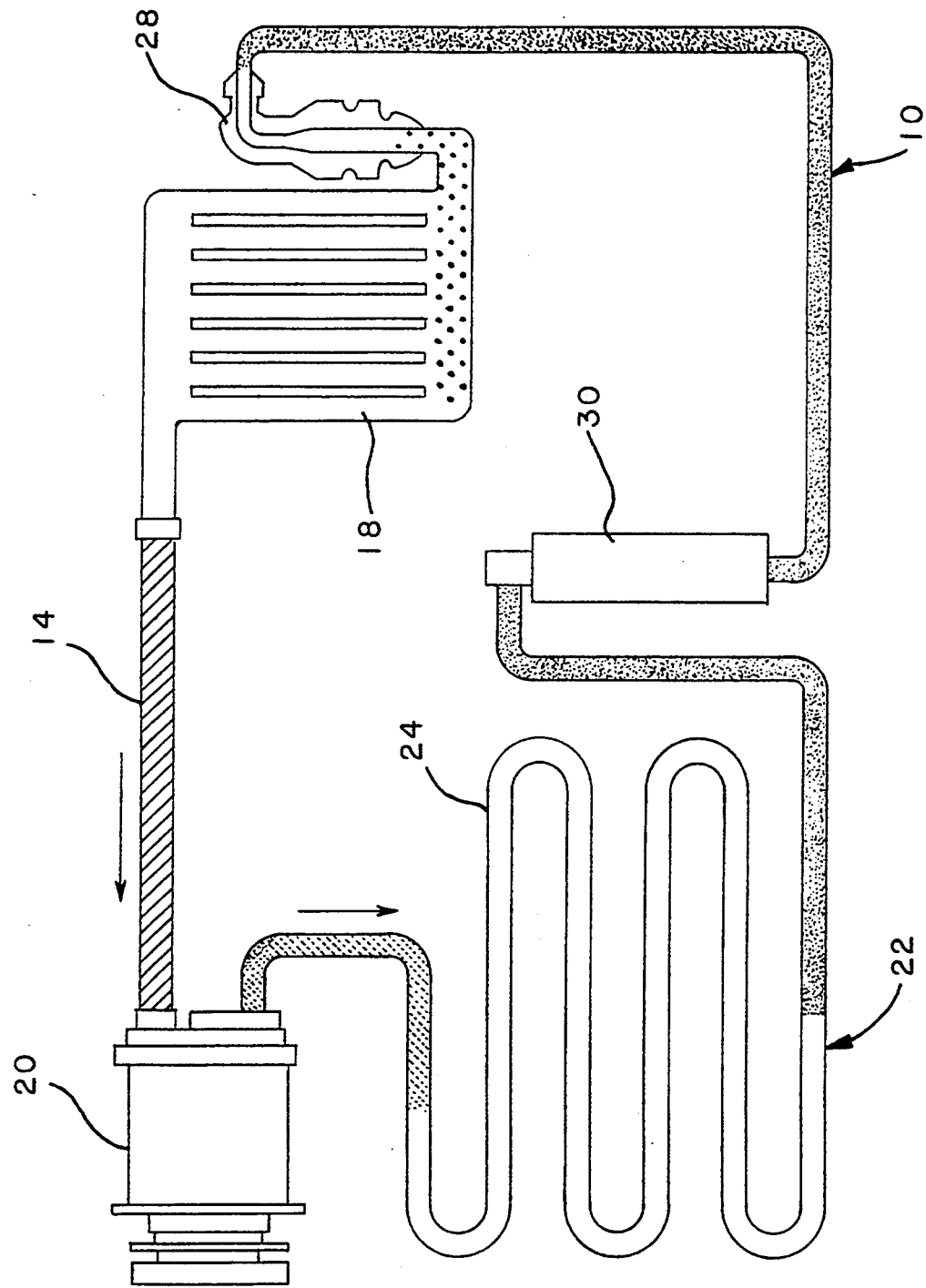
FIG. 1 is a schematic illustration of a basic refrigeration system of an automobile air conditioner, using a receiver-drier between the condenser and evaporator.
Figure 2:
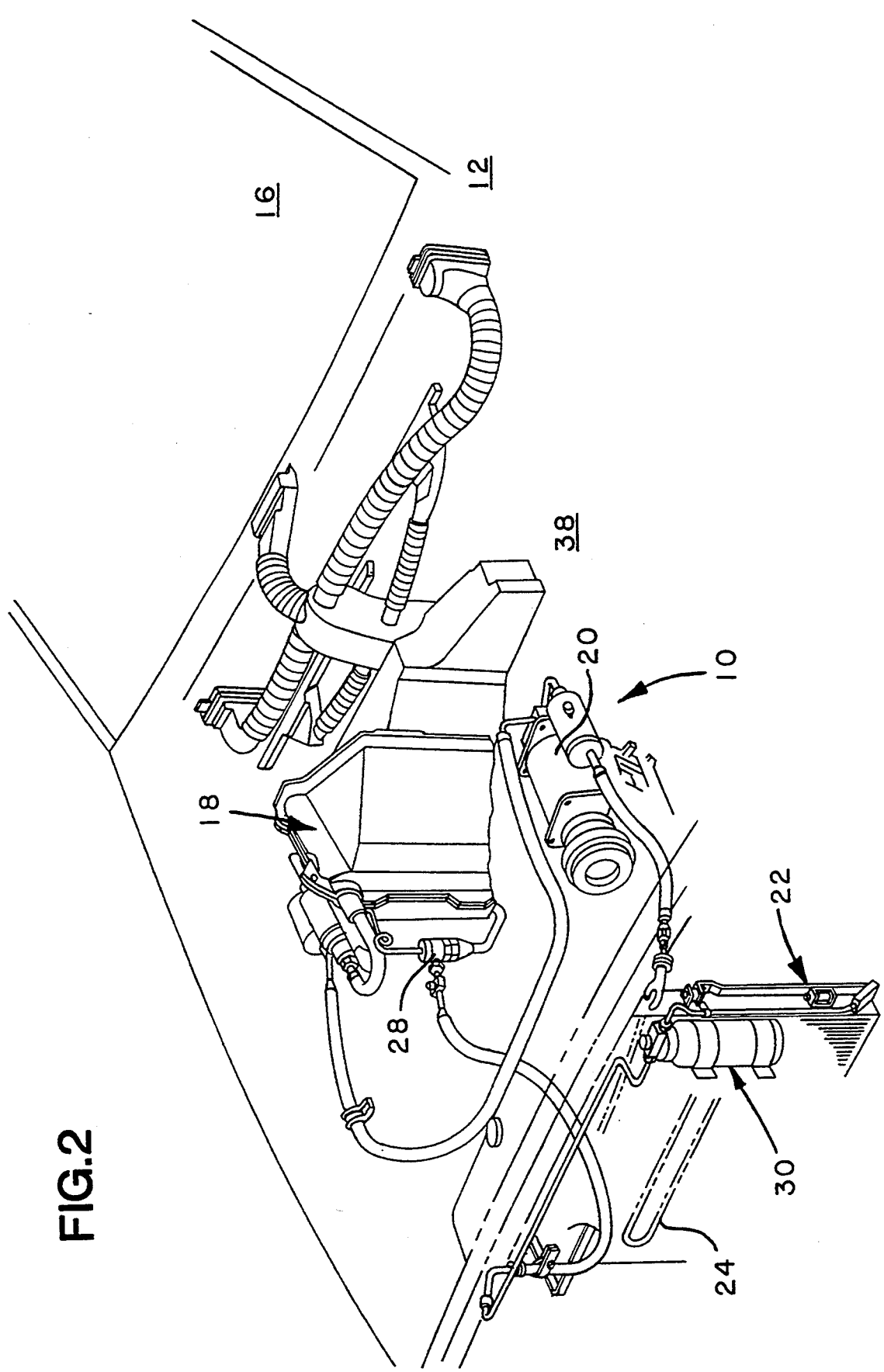
FIG. 2 is a perspective view of an automobile air conditioner system showing the major components as installed in an automobile.

Referring to the drawings in detail, wherein like numerals indicate like elements, FIG. 1 illustrates a basic closed refrigeration circuit 10 of an automobile air conditioner, by which air inside the automobile is cooled and dehumidified. FIG. 2 provides greater detail of the system 10 as it is arranged in an automobile 12.

A refrigerant 14, such as R-12 or more recently R-134a, circulates under pressure in the refrigeration system. In each cycle, the refrigerant is caused to change phase from liquid to gas and back to liquid, absorbing heat from the passenger compartment 16 and releasing heat outside the compartment.

More specifically, the air conditioning system 10 has an evaporator unit 18 where subcooled liquid refrigerant enters and is allowed to expand and absorb heat from warm air of the passenger compartment, causing the refrigerant to vaporize. The warm air of the passenger compartment 16 is connected to the evaporator 18 via ducting, as seen in FIG. 2, such that the cooled and dried air is recirculated into the passenger compartment. After absorbing heat from the passenger compartment, the refrigerant gas is drawn from the evaporator by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation, and changes phase back to a hot liquid, still at a high pressure. The refrigerant 14 completes the cycle by passing through a thermostatic expansion valve 28, which meter the high pressure liquid refrigerant 14 as a low pressure spray into the evaporator 18.

Figure 3:
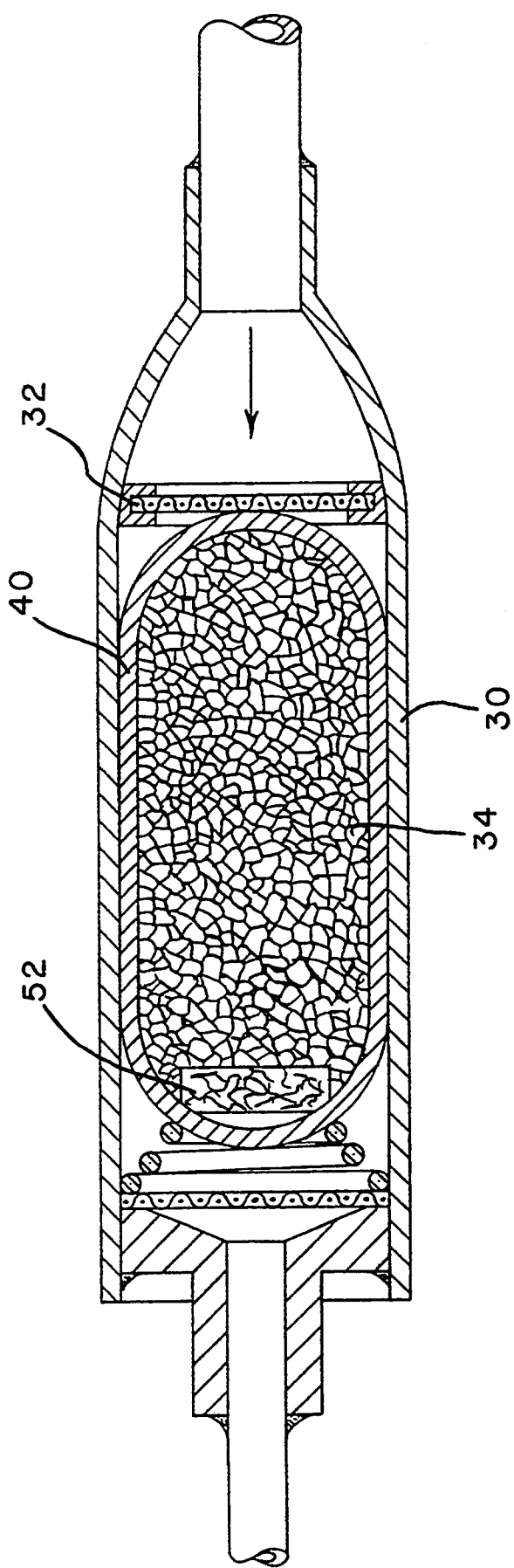
FIG. 3 is a sectional view of a receiver-dryer unit having installed therein a desiccant bag, containing a dye-wafer according to the invention.

In some systems it is necessary to reservoir the liquid refrigerant before it is metered through the expansion valve because the demand of the evaporator varies under varying conditions. In other systems it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment a receiver-dehydrator 30 is located between the condenser 22 and the evaporator 18 to reservoir the refrigerant and remove moisture from it. In other air conditioner systems, an accumulator-drier may be located between the evaporator and compressor to accumulate the refrigerant vapor and remove moisture from it. As shown in FIG. 3, the receiver-dehydrator 30 contains a filter 32 to remove foreign particles and a bag 40 of desiccant material 34 to remove moisture from the circulating refrigerant 14.

Although not depicted, it will be understood by those skilled in the art that desiccant bags are also used in the accumulator of a cycling clutch orifice tube (CCOT) type of automobile air conditioner, and in the Valves-in-Receiver (VIR) assembly of VIR type air conditioners, and may be found in other locations of the refrigerant circuit in other types of refrigeration systems. A dye-additive swatch may be placed in the desiccant bags used with any such system.

As shown in FIG. 2, the air conditioning system components are located in different parts of the engine compartment 38 and attached to various other components of the automobile. Thus, final assembly of the air conditioner usually occurs at the time of its installation into the automobile, and the system cannot be charged with refrigerant until this point. When the air conditioner is assembled and installed in the automobile, the system is evacuated to remove air and moisture prior to charging with refrigerant. The system is charged by releasing refrigerant under pressure from a container through the system service valves to enter the system.

Since the refrigerant is under considerable pressure in a container or service hose, there is a risk of its inadvertent escape and contamination of surroundings. The automobile assembly workers charging the air conditioners typically wear safety goggles, gloves and protective clothing, and use rags to wipe valve fittings. This creates the problem that if the exterior of the air conditioner is contaminated by escaping refrigerant during charging, or by contact with contaminated clothing, the dye additive in the refrigerant will fluoresce under ultra-violet illumination and give false leak indications.

This invention provides a method of introducing a leak detection dye additive into the air conditioning system before the system is charged with refrigerant, but which will allow the dye to be released and disperse into the refrigerant immediately after the system is charged and circulated.

A dye-containing swatch 52 is produced from a substrate material which is absorbent to the dye additive but which does not react with refrigerant or the system lubricant. In a preferred embodiment for use inside a desiccant bag as described above, a melamine treated 100% polyester felt mat is cut into circular disks or wafers. A metered amount of dye additive is applied to each wafer and allowed to absorb into the material. For this embodiment, the wafer has a circular shape ¾ of an inch in diameter and a thickness of 0.315 inch. The disk is cut such that there are no loose fibers or felt residue from the cutting procedure.

A specific quantity of the dye additive is metered onto the wafer and allowed to absorb into the felt material to form the swatch 52. The amount of dye is dependant upon the volume of refrigerant and lubricant that will be introduced into the system, the concentration of dye necessary to make leaks visible, and the amount of dye that can exist in the system without adversely effecting its operation.

One preferred dye additive is a fluorescent, alkyl substituted perylene dye compound dissolved in an oil which is the same as the system lubricating oil, or which is otherwise compatible with the refrigerant, such as the AR-GLO ® and FLUORO-LITE ® leak detection additives sold by Spectronics Corporation. This dye is soluble in polyhalogenated hydrocarbon refrigerants and fluoresces a brilliant yellow-green under illumination by long wave ultraviolet light. In an automobile air conditioner system which has a fully-charged capacity of thirty-three ounces of R-134a refrigerant and seven ounces of PAG lubricating oil, an amount of 0.014 ounces of AR-GLO 4/PAG ® dye additive is effective to locate leaks without adversely effecting the operation of the system. This amount and an additional amount that will remain on the disk, typically 10 percent, is metered onto a disk and allowed to absorb into the disk to create the swatch 52. The tracer swatches 52 are then packaged in quantity (usually 1000) in a sealed moisture-proof bag for shipment to a desiccant bag manufacturer or a receiver-drier manufacturer.

Prior to installing the desiccant material 34 in the receiver-dehydrator 30, a tracer swatch 52 having the leak detection dye 50 is placed into the permeable bag 40, then the particles of desiccant material 34 are added, and the bag is closed to retain the particles.

The desiccant bag 40 is itself then installed in receiver-dehydrator 30. Sealed receiver-dehydrators are shipped to the automobile or engine assembly plant to be installed in the air conditioning system as it is assembled. Upon the air conditioning system 10 being fully connected, it is evacuated and then charged with its initial refrigerant 14. Upon charging and running the system, the dye 50 is mixed with and dissolved in the refrigerant 14 as the refrigerant travels through the desiccant bag 40.

Figure 4:
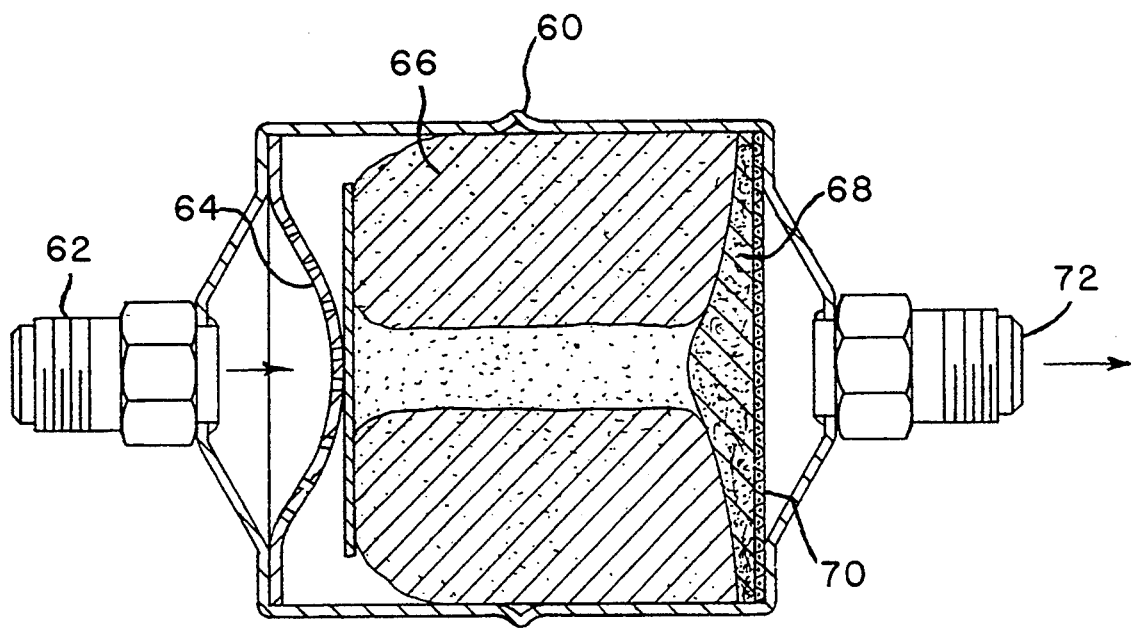
FIG. 4 is a perspective view of an in-line solid core filter-drier with portions of the casing and desiccant core cut away, wherein a dye-absorbed substrate is installed as a filter component.

FIG. 4 shows another embodiment of the invention. An in-line solid core filter-drier 60 may be used in a liquid refrigerant line of an air conditioning system. Circulating refrigeration liquid enters at the inlet side 62, passes through an opening 64 shaped in a solid core of desiccant material 66, through a fine mesh filter material 68 and a screen filter 70, and emerges from the outlet side 72. A substrate of random mesh material which is absorbent to the dye additive, but which does not react with refrigerant, may be used as the filter material 68. Alternatively, a dye-containing substrate of woven or screen-meshed material which is absorbent to the dye additive, but which does not react with refrigerant, may be used as the screen filter 70.

Figure 5:
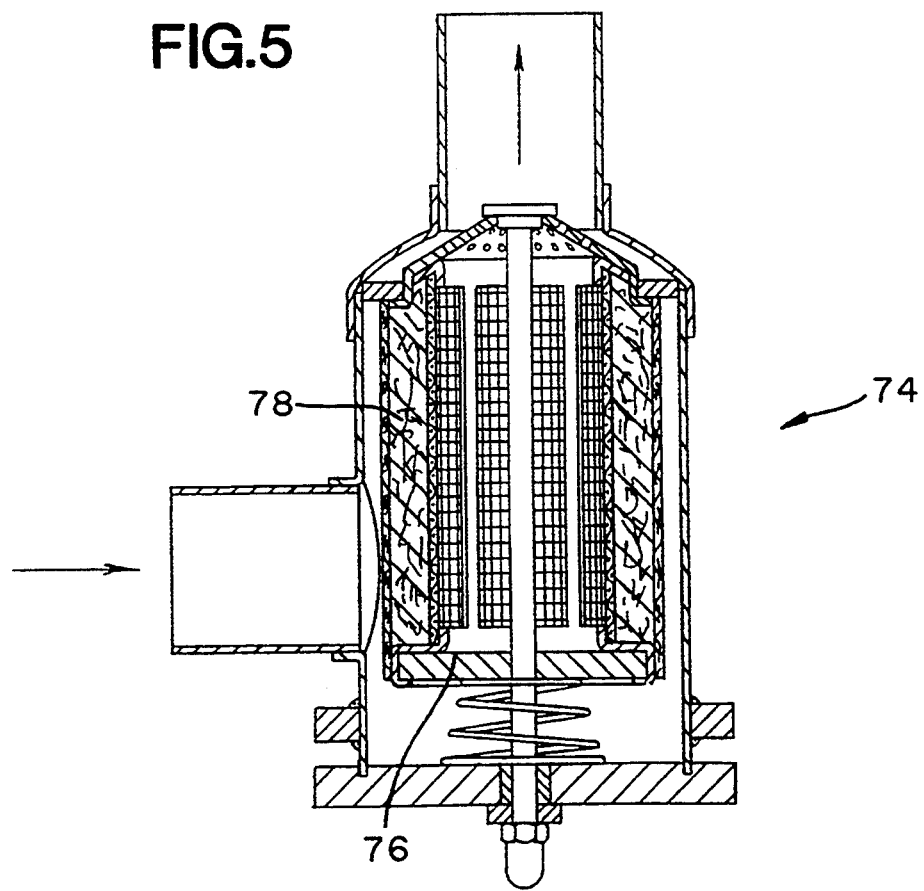
FIG. 5 is a perspective view of a filter-drier with replaceable cartridge, wherein a dye-absorbed substrate is installed as a pre-filter component.

FIG. 5 shows a filter-drier unit 74 with a replaceable cartridge 76. A dye-containing substrate of fabric material, such as polyester felt, may be used as the circumferential filter material 78 surrounding the porous cartridge walls to act as a pre-filter after releasing its dye to the refrigerant.

The invention may be embodied in other specific forms without departing from the spirit or central attributes thereof. For example, other substrate materials, such as natural or synthetic sponge, sintered brass or other metals, or even the desiccant beads may be substituted for those described above. The substrate may have various shapes, and quantities and dimensions may be varied as desired for specific applications. Various dye additives may be used, in particular, additives prepared from a fluorescent alkyl-substituted napthalimide dye compound which fluoresce bright green under long-wave ultraviolet irradiation. Accordingly, reference should be made to the claims, rather than to the foregoing specification, as indicating the scope of the invention.

What is claimed is:

1. A method of introducing a leak detection additive into a refrigeration system in which a refrigerant and a refrigeration lubricant are circulated, comprising the steps of:
   providing a substrate of material which is capable of absorbing and releasing a leak detection additive;
   placing a predetermined amount of a leak detection additive, which is soluble in the refrigerant and refrigeration lubricant, on the substrate and allowing the additive to absorb into the substrate;
   installing the additive-absorbed substrate in a component of the refrigeration system through which refrigerant circulates when the system is assembled and operated;
   assembling the refrigeration system to include the component containing the additive-absorbed substrate;
   charging the refrigeration system with a refrigerant; and
   circulating the refrigerant in the refrigeration system to release the leak detection additive into the refrigerant and system lubricant.

2. A method as in claim 1, wherein the step of installing the substrate in a component of the refrigeration system is performed by the sub-steps of:
   inserting the substrate in a desiccant bag, and
   inserting the desiccant bag in a component of the refrigeration system where water is removed from the refrigerant.

3. A method as in claim 2, wherein the substrate is a swatch of polyester felt.

4. A method as in claim 2, wherein the leak detection additive includes a fluorescent dye compound which is soluble in the refrigerant and system lubricant.

5. A method as in claim 4, wherein the dye compound comprises a fluorescent, alkyl substituted perylene dye.

6. A method as in claim 5, wherein the leak detection additive further includes a refrigeration lubrication oil.

7. A method as in claim 4, wherein the dye compound comprises a fluorescent, alkyl substituted napthalimide dye.

8. A method as in claim 7, wherein the leak detection additive further includes a refrigeration lubrication oil.

9. A method as in claim 1, wherein the substrate is a swatch of random mesh material, and wherein the step of installing the substrate in a component of the refrigeration system is performed by packing the swatch across an end of a desiccant core in a solid-core filter-drier component of the refrigeration system.

10. A method as in claim 1, wherein the substrate is a woven material, and wherein the step of installing the substrate in a component of the refrigeration system is performed by installing the woven material as a screen filter in a filter-drier component of the refrigeration system.

11. A method of introducing a leak detection additive into a refrigeration system in which a refrigerant and refrigeration lubricant are circulated, comprising the steps of:

provinding a substrate of material which is capable of absorbing and releasing a leak detection additive;

placing on the substrate an effective amount of a leak detection additive, which is soluble in the refrigerant and refrigeration lubricant, and allowing the additive to absorb into the substrate;

installing the additive-absorbed substrate in a component of the refrigeration system through which refrigerant circulates when the system is assembled and operated;

assembling the refrigeration system to include the component containing the additive-absorbed substrate;

charging the refrigeration system with a refrigerant; and circulating the refrigerant in the refrigeration system to release the leak detection additive into the refrigerant and system lubricant.

12. A method as in claim 11, wherein the substrate is pre-cut and the effective amount of the leak detection additive is metered onto the substrate.

13. A method of introducing a leak detection additive into a refrigeration system in which a refrigerant and a refrigeration lubricant are circulated, comprising the steps of:

providing a substrate of material which is capable of absorbing and releasing a leak detection additive;

placing on the substrate an effective amount of a leak detection additive that fluoresces under ultraviolet light, which is soluble in the refrigerant and refrigeration lubricant, and allowing the additive to absorb into the substrate;

installing the additive-absorbed substrate in a component of the refrigeration system through which refrigerant circulates when the system is assembled and operated;

assembling the refrigeration system to include the component containing the additive-absorbed substrate;

charging the refrigeration system with a refrigerant;

circulating the refrigerant in the refrigeration system to release the leak detection additive into the refrigerant and system lubricant; and exposing the exterior of the refrigeration system to ultraviolet light allowing visual detection of refrigerant leaks by lighting the fluoresce of the leak detection additive, wherein a leak in the refrigeration system may be detected.

* * * * *